(12) United States Patent
Smith et al.

(10) Patent No.: US 7,387,754 B2
(45) Date of Patent: Jun. 17, 2008

(54) COATING INJECTION MOULDED ARTICLES

(75) Inventors: Gordon Frederick Smith, Warwick (GB); Rui Magalhaes, Coventry (GB)

(73) Assignee: University of Warwick, Coventry (GB)

( * ) Notice: Subject to any disclaimer, the term of this patent is extended or adjusted under 35 U.S.C. 154(b) by 621 days.

(21) Appl. No.: 10/864,036

(22) Filed: Jun. 9, 2004

(65) Prior Publication Data

US 2005/0001360 A1  Jan. 6, 2005

(30) Foreign Application Priority Data

Jun. 14, 2003 (GB) ................................ 0313802.1

(51) Int. Cl.
*B29C 45/16* (2006.01)
(52) U.S. Cl. ............................................. 264/81
(58) Field of Classification Search ........ 264/DIG. 72, 264/81, 269, 255
See application file for complete search history.

(56) References Cited

U.S. PATENT DOCUMENTS

| | | | |
|---|---|---|---|
| 4,282,285 A | | 8/1981 | Mohiuddin ............... 428/315.5 |
| 4,350,739 A | * | 9/1982 | Mohiuddin ............... 428/425.1 |
| 4,681,712 A | * | 7/1987 | Sakakibara et al. ......... 264/440 |
| 5,116,557 A | * | 5/1992 | Debaes et al. ............. 264/46.6 |
| 5,582,227 A | * | 12/1996 | Schuch et al. ................. 164/15 |
| 5,882,559 A | | 3/1999 | Eckardt et al. ............. 264/45.1 |
| 6,348,172 B1 | * | 2/2002 | Barnes ....................... 264/309 |
| 6,649,107 B2 | * | 11/2003 | Harrison et al. ............ 264/241 |
| 6,849,218 B1 | * | 2/2005 | De Winter et al. ......... 264/240 |

FOREIGN PATENT DOCUMENTS

| | | | |
|---|---|---|---|
| EP | 0271051 | | 6/1988 |
| EP | 1088648 | * | 4/2001 |
| WO | WO 96/03264 | | 2/1996 |

OTHER PUBLICATIONS

JP 60240418, Itoi et al., Preparation of Plastic Container with Conductive Film, Patent Abstracts of Japan, Nov. 29, 1985.
JP 63172622, Takahara Yoichiro, Injection Molding Method and Equipment Therefor, Patent Abstracts of Japan, Jul. 16, 1988.
JP 63037909, Amano Noriko, In-Mold Coating of Injection-Molded Item with Thermosetting Coating, Patent Abstracts of Japan, Feb. 18, 1988.
JP 06320246, Kubota Masamitsu, Spraying Device of Powder Die Release Agent, Patent Abstracts of Japan, Nov. 22, 1994.

* cited by examiner

*Primary Examiner*—Jill L. Heitbrink
(74) *Attorney, Agent, or Firm*—Mathews, Shepherd, McKay & Bruneau, P.A.

(57) ABSTRACT

A method of coating an article during injection molding wherein coating material carried by a high pressure carrier gas is blasted at high velocity directly onto the internal walls of a closed mold and then a plastics substrate is injected into the coated mold to form in-situ a coated molded product.

18 Claims, 1 Drawing Sheet

COATING INJECTION MOULDED ARTICLES

BACKGROUND OF INVENTION

Figure 1:
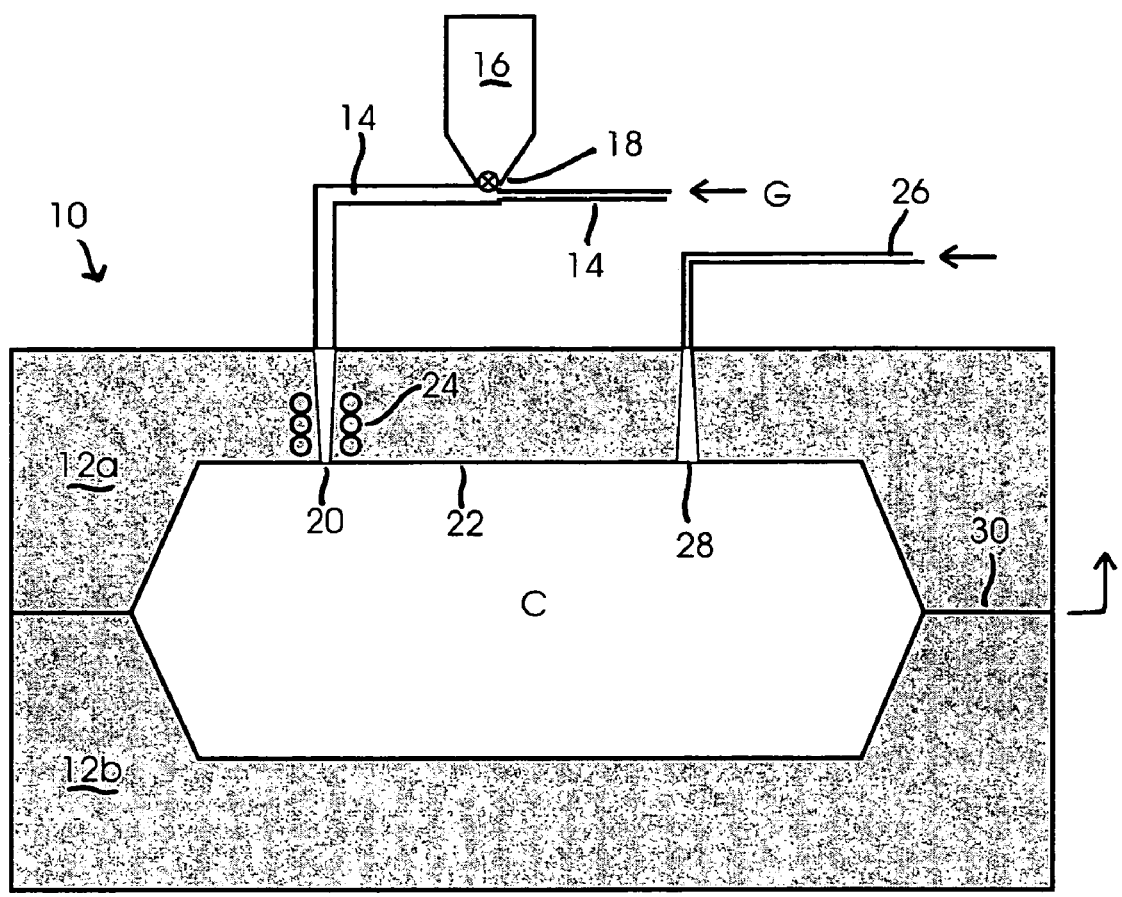

This invention relates to a method of coating an article as it is produced during injection moulding and to the products of such a method. In particular, it relates to the use of paint for such coating.

Assembly industries are making increasing use of components produced by injection moulding. Frequently such components need to be coated in order to provide an article with the necessary surface finish; for example, painting body components of motor vehicles. Such industries have typically used painting shops. However, paint shops have a high capital cost and often require a long commissioning period before painted surfaces of sufficiently high quality can be achieved. In addition, they are environmentally unfriendly; provide an opportunity for foreign particles to accumulate on components awaiting painting; and represent an undesirable secondary operation.

In order to overcome these drawbacks attempts have been made to apply paint during the actual injection moulding step. Thus, a method of forming a moulding with a coating using dual injection is known. Typically, a plastics paint material is first injected into a mould so as to only partially fill the mould. A plastics substrate material is then injected within this plastics paint material so that as the moulding is formed the plastics paint material encapsulates the plastics substrate until at the end of the moulding process it forms an outer coating for the moulded article. While this method has many advantages over traditional secondary painting in spraying shops, there is one drawback; disruption of the paint flow due to a hole or other surface feature may result in so called "weld lines" in the vicinity of such features. This problem is particularly evident when metallic paints are used.

Powder paints and gel coats have been used to coat mould tools; but the tool has always been in the open condition. Even with careful masking of areas, paint generally coats the tool "shut-off" edge adversely affecting sealing.

BRIEF SUMMARY OF INVENTION

An object of the present invention is to produce an improved method of coating articles in-situ as they are produced during various known injection moulding processes. Another object is to provide such a method of coating an article that largely overcomes the problem of "weld lines". While the method of the invention is particularly suited for painting articles, it is also suitable for other coating operations; for example, applying hard coats, soft-feel, and conductive systems.

In one aspect the invention is a method of coating an article during injection moulding comprising the following steps:
  (a) injecting a coating material in dispersed form onto the internal walls of a closed mould;
  (b) injecting a plastics substrate into the coated mould to form in-situ a coated moulded product.

Preferably, the coating is injected using a carrier gas; for example by entrainment in a gas such as nitrogen or carbon dioxide. Preferably the carrier gas is at a pressure of 3 to 100 bara and more preferably at a pressure of 20 to 60 bara. Preferably, the duration of the coating injection step is in the range 1 to 5 seconds. Nitrogen is suitable for all pressures; while carbon dioxide is suitable for lower pressures. The use of high pressure carrier gas is advantageous because it results in coating particles or droplets entering the mould at a very high velocity through a nozzle. This has an effect similar to a "silent" explosion; in that coating material is blasted onto the cavity walls. Preferably, after injection of coating material and prior to injection of plastics substrate the gas pressure is at least partly relaxed. Carrier gas provides both atomisation (for liquid coatings) and a transport medium (for particulate coatings); in the case of liquid coatings the carrier gas also provides means of removing evaporated solvent. Hence, in this case it is desirable to continue the flow of carrier gas for a further period; typically of 1 to 10 seconds duration, following the coating injection period. High pressure carrier gas also combats any hesitancy in the flow of coating, or blockage, which will be pushed through the cavity.

Paint chemistry is selected in order to ensure adhesion to the plastics substrate. Within this constraint a wide variety of paints are suitable. Preferably, coating material is injected in particulate form; in this case the average particle size is within the range 10 to 100 μm; typically about 40 μm. Alternatively, the coating is injected in liquid form; for example, dissolved in a solvent. Preferably coating material is injected through a nozzle heated to a temperature in the range 150 and 200° C. The coating is blasted onto the internal wall surface of the cavity formed by the closed mould thus forming a skin. Preferably the wall surfaces are heated. The walls may be heated to a temperature in the range 40 to 180° C., preferably 80 to 140° C., and most preferably 80 to 120° C. Heating the wall surfaces offers the advantage of assisting the formation of a skin and in particular of obtaining a skin of substantially uniform thickness. The temperature of the mould tool is selected to allow efficient cooling and ejection of the moulded component; whilst ensuring that the coating has achieved the required properties.

The coating may be electrostatically charged prior to injection in order to increase the proportion of injected coating that contributes to the formation of the skin layer.

The coating material may be a paint; for example polymeric paint with thermoplastic properties; such a paint is Akzo Nobel Interpon™ The coating material may also be polymeric with substantially thermosetting properties which will pass through a plastic phase as a result of applied heating; for example, a non-paint coating such as Dupont Reflection™.

In another aspect the invention comprises a method of coating an article during injection moulding wherein coating material carried by a high pressure carrier gas is blasted at high velocity directly onto the internal walls of a closed mould and then a plastics substrate is injected into the coated mould to form in-situ a coated moulded product.

BFIEF DESCRIPTION OF DRAWING

The invention will now be described, by way of example only with, reference to FIG. 1.

DETAILED DESCRIPTION OF THE INVENTION

FIG. 1 is a schematic diagram showing the arrangement of apparatus suitable for carrying out the method of the invention. A mould 12a, 12b is shown in a closed position. Coating material is stored in particulate form in vessel 16 and is metered into a carrier gas stream (G—see latter) by valve 18. Carrier gas G is provided at a pressure of 50 bara and flows via duct 14 and valve 18 to injection nozzle 20. The exit of injection nozzle 20 is located on the inside wall 22 of mould 12. Nozzle 20 has a heater 24 and the inside wall 22 of the mould is also heated in both cases to assist melting of coating material. Valve 18 allows particulate coating material to be metered from vessel 16 into carrier gas G and thus injected through nozzle 20 into cavity C. Valve 18 also allows flow of carrier gas alone. Plastic substrate is injected through channel 26 and inlet port 28 to the mould cavity C. Carrier gas exits the mould through a vented split line 30 in the mould. Alternatively, a vent duct (not shown) may be provided with a pressure relief control system, in order to assist control of pressure within the mould cavity C.

A moulding cycle may comprise the following stages
(a) Closure of moulds 12a and 12b (as FIG. 1);
(b) Injection of carrier gas G at a pressure of 50 bar containing the coating material; for a period of 3 seconds;
(c) Relaxation of gas pressure in cavity to 1 bara;
(d) Injection of plastics substrate followed by conventional moulding steps.

If a liquid coating is used then carrier gas flow may continue during stage (c) for a further period of about 5 seconds after completion of the coating injection step; this facilitates evaporation of the solvent Sufficient coating will be metered through the gas injection system to provide an even coating; the coating may "insulate" the walls thus encouraging even thickness and avoiding local areas of over-thickness.

When the coating material is paint both thermoplastic and thermoset powder coatings may be used. If thermoplastic powder coating material is used the powder will melt as it passes through the injection nozzle into the mould cavity. At the high pressure and velocity of injection the coating will be blown over the entire inner surface of the tool (mould). The powder coating will fuse and solidify on the surface of the tool. In the case of a thermoset powder coating the temperature of injection will be set so as to melt the powder and trigger initiation of the cure process during passage of the powder through the nozzle and mould cavity. Molten powder will cover the inner surface of the mould cavity and the cure process will be finalised by heat provided from injected plastics substrate.

The inner mould walls 22 are typically heated to a temperature of 120° C.; this is hot enough to cure and cross-link thermoset paint or alternatively warm enough to diffuse the paint such that it may be cured latter. The coating material storage and feeding system 16, 18 may be as supplied by Matrix Paints Ltd, 8b James Road, Tyseley, Birmingham, West Midlands B11 2BA.

The process offers improved control of paint thickness. This allows higher quality products with more even surface aesthetics to be produced and may also allow paint costs to be reduced. The method avoids the weld line problem; that may result from inserting a hole in the moulded item, and also avoids the split line problem; that may result from the interface of two mould sections.

We claim:

1. A method of coating an article during injection moulding comprising the following steps:
   (a) blasting a coating material carried by a high pressure carrier gas at high velocity directly onto the inner surface of a closed mould such that the coating is blown over the entire said inner surface of the mould; and;
   (b) injecting a plastics substrate into the coated mould to form in-situ a coated moulded product.

2. A method according to claim 1 wherein the carrier gas pressure is at least 10 bara.

3. A method according to claim 1 wherein the carrier gas is at a pressure in the range 3 to 100 bara.

4. A method according to claim 1 wherein the carrier gas is at a pressure in the range 20 to 60 bara.

5. A method according to claim 1 wherein carrier gas flows to the mould before and/or after a period during which coating material is injected.

6. A method according to claim 5 wherein the carrier gas flows for a period of between 1 to 10 seconds into the mould following injection of coating and during which period the mould is vented to the atmosphere.

7. A method according to claim 1 wherein the coating is injected in particulate form.

8. A method according to claim 1 where the coating is injected in liquid form.

9. A method according to claim 1 wherein the coating is injected through a heated nozzle.

10. A method according to claim 9 where the nozzle is heated to a temperature between 150 and 200° C.

11. A method according to claim 1 wherein the cavity walls are heated in order to assist accumulation of the coating on the cavity walls.

12. A method according to claim 11 wherein the walls are heated to a temperature in the range 40 to 180° C.

13. A method according to claim 1 wherein the duration of the coating injection step is in the range 1 to 5 seconds.

14. A method according to claim 1 wherein the coating material is paint.

15. A method according to claim 1 wherein the coating material is electrostatically charged prior to injection.

16. A method according to claim 1 where the carrier gas is nitrogen or carbon dioxide.

17. A method according to claim 1 wherein the coating material is polymeric with substantially thermosetting properties.

18. A method according to claim 1 wherein the coating material is a polymeric paint with thermoplastic properties.

* * * * *